US009925905B2

(12) United States Patent
Adriani (10) Patent No.: US 9,925,905 B2
(45) Date of Patent: Mar. 27, 2018

(54) TAILGATE RAMP AND METHOD OF USING SAME

(71) Applicant: Victor Adriani, Charlotte Hall, MD (US)

(72) Inventor: Victor Adriani, Charlotte Hall, MD (US)

(*) Notice: Subject to any disclaimer, the term of this patent is extended or adjusted under 35 U.S.C. 154(b) by 114 days.

(21) Appl. No.: 14/929,459

(22) Filed: Nov. 2, 2015

(65) Prior Publication Data

US 2016/0129824 A1    May 12, 2016

Related U.S. Application Data

(60) Provisional application No. 62/076,629, filed on Nov. 7, 2014, provisional application No. 62/114,622, filed on Feb. 11, 2015.

(51) Int. Cl.
*B60P 1/43* (2006.01)

(52) U.S. Cl.
CPC .................... *B60P 1/435* (2013.01)

(58) Field of Classification Search
CPC ....................................... B60P 1/435
USPC ........................................... 296/61
See application file for complete search history.

(56) References Cited

U.S. PATENT DOCUMENTS

| | | | |
|---|---|---|---|
| 4,735,454 A * | 4/1988 | Bernard | B60P 1/435 296/51 |
| 4,795,304 A | 1/1989 | Dudley | |
| 4,944,546 A | 7/1990 | Keller | |
| 4,979,867 A | 12/1990 | Best | |
| 5,133,584 A | 7/1992 | McCleary | |
| D338,760 S | 8/1993 | Harrah | |
| 5,244,335 A | 9/1993 | Johns | |
| 5,273,335 A * | 12/1993 | Belnap | B60P 1/435 14/71.1 |
| 5,342,105 A | 8/1994 | Miles | |
| 5,540,474 A | 7/1996 | Holland | |
| 5,641,262 A * | 6/1997 | Dunlop | B60P 1/4414 254/10 R |
| 5,768,733 A | 6/1998 | Kneebone | |
| 5,907,276 A | 5/1999 | Lance | |
| 5,988,725 A * | 11/1999 | Cole | B60P 1/435 296/61 |
| 6,076,215 A | 6/2000 | Blankenship | |
| 6,447,040 B1 | 9/2002 | Young, Sr. | |
| 6,712,416 B1 * | 3/2004 | Jones | B62D 33/0273 296/51 |
| 6,722,721 B2 | 4/2004 | Sherrer | |
| 6,746,068 B1 | 6/2004 | Hurd | |

(Continued)

OTHER PUBLICATIONS

Truck Loading Ramp retrieved on Jul. 28, 2015 from http://www.sportsturfmagic.com/ProductPages/TailGateRamp.html.

(Continued)

*Primary Examiner* — James Keenan
(74) *Attorney, Agent, or Firm* — Cahn & Samuels, LLP (57) ABSTRACT

A tailgate ramp for a truck includes an adapter comprising left and right panels with a connector extending therebetween. The connector includes a first end with a slot or opening to engage or slide onto a pivoting receiver located on a truck; and a second opposing end configured to slide into, over, or around a mounting receiver located on the truck. A ramp section includes at least one foldable section that is attachable to the connector.

17 Claims, 13 Drawing Sheets

(56) References Cited

U.S. PATENT DOCUMENTS

| | | | |
|---|---|---|---|
| D505,238 S | 5/2005 | Robertson | |
| 7,070,220 B1 | 7/2006 | Lantaigne | |
| 7,458,624 B1 | 12/2008 | Bower et al. | |
| 7,549,692 B2 | 6/2009 | Washington | |
| D633,684 S | 3/2011 | Key | |
| D640,854 S | 6/2011 | Leum | |
| 8,109,552 B2 | 2/2012 | Nelson | |
| 8,302,235 B1 | 11/2012 | Bailie et al. | |
| D674,162 S | 1/2013 | Gooch | |
| 8,511,734 B2 | 8/2013 | Hutchins, Jr. et al. | |
| 8,764,088 B1 | 7/2014 | Jobe | |
| 8,894,345 B1 | 11/2014 | Richins et al. | |
| 2003/0015885 A1 | 1/2003 | Landwehr | |
| 2006/0133915 A1 | 6/2006 | Day | |
| 2007/0278813 A1* | 12/2007 | Keehle | B62D 33/0273 296/61 |
| 2008/0159838 A1 | 7/2008 | Sherer | |
| 2008/0174138 A1* | 7/2008 | Huggins | B60P 1/435 296/61 |
| 2010/0178142 A1* | 7/2010 | Noddin | B60P 1/435 414/462 |

OTHER PUBLICATIONS

ATV Ramp and Tailgate retrieved on Jul. 28, 2015 from http://tailgateramps.com/pictures.htm.
Tailgate Ramp retrieved on Jul. 28, 2015 from http://www.bmwmccc.org.za/tailgate-ramp.
Tailgate Ramp retrieved on Sep. 18, 2015 from http://www.pickupspecialties.com/Loading_Ramps/tailgate_ramps.htm.

* cited by examiner

TAILGATE RAMP AND METHOD OF USING SAME

This application claims priority to U.S. Ser. No. 62/076,629 filed on Nov. 7, 2014 and U.S. Ser. No. 62/114,622 filed on Feb. 11, 2015, the entireties of both of which are incorporated herein by reference.

BACKGROUND OF THE INVENTION

There are several versions of a tailgate ramp that are offered in the market. Currently, most of the versions target commercial vehicles and are purely utilitarian with minimal appeal to individuals.

SUMMARY OF INVENTION

According to one aspect of the present invention, a tailgate ramp for a truck or other vehicle is provided. The tailgate ramp comprises an adapter comprising left and right panels with a connector extending therebetween. The connector comprises a first end with a slot or opening to engage or slide onto a pivoting receiver located on a truck; and a second opposing end configured to slide into, over, or around a mounting receiver located on the truck. A ramp section comprising at least one foldable section is attachable to the connector.

According to another aspect of the present invention, the right and left panels are angled inwards from the sides of the truck.

According to another aspect of the present invention, the tailgate ramp may have right and left panels that each comprise 1) a first section having a cut-out that surrounds a bolt or protrusion on the truck when in-use, 2) a second section angled inwardly from the first section, and 3) a third section extending rearwardly from the second section to engage or hold said ramp section when folded.

According to an embodiment of the present invention, a method for attaching a tailgate ramp to a truck is provided. A tailgate is removed from a rear of a truck, thereby exposing a mounting receiver and a pivoting receiver on the truck. An adapter is attached to the rear right side and rear left side of the truck. The adapter comprises left and right panels with a connector extending therebetween. The connector comprises a first end with a slot or opening to engage or slide onto the pivoting receiver; a second opposing end configured to slide into, over, or around the mounting receiver. A ramp section comprising at least one foldable section is attached to the connector.

According to another embodiment of the present invention, a kit is provided. The kit comprises at least one adapter and a ramp section comprising two or more foldable sections.

An object of at least one embodiment of the present invention is to provide a tailgate ramp that can service and satisfy the needs of tradesmen, handymen, all-terrain vehicle (ATV) users (e.g., hunters, weekend riders), gardeners, homeowners, truck enthusiasts, and the like.

An advantage of at least one embodiment of the present invention is that the tailgate ramp may replace an existing factory tailgate without requiring alterations to a truck.

Another advantage of at least one embodiment of the present invention is that the tailgate ramp allows a user to load heavy items more easily by allowing the use of a hand dolly and the like. The tailgate ramp provides the user with ease for the loading and unloading of ATVs, lawn tractors, other recreational items, yard waste, debris, and the like.

Yet another advantage of at least one embodiment of the present invention is that the tailgate ramp may improve gas mileage as it is allows air to pass through it thus reducing drag caused by a stock tailgate.

Another advantage of at least one embodiment of the present invention is that the tailgate ramp can also be deployed to serve as either a work surface for tradesmen/homeowners.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated. Thus, the invention can include any variety of combinations and/or integrations of the embodiments described herein.

DETAILED DESCRIPTION OF INVENTION

According to the present invention, a tailgate ramp for a truck comprises an adapter for fixing a foldable ramp section onto the back of a truck after a tailgate is removed.

A. Adapter

In an embodiment, the adapter comprises left and right panels with a connector therebetween. In specific embodiments, the connector may be, for example, any effective shape, such as a tube. The connector may have 1) a first end having a slot or opening to engage or slide onto a pivoting receiver located on a truck, and 2) a second opposing end configured to slide into, around, or over a mounting receiver (e.g., circular receiver) located on a truck. The ends of the connector may have a TEFLON® coating or sleeve. In a specific embodiment, the connector may comprise two or more sections with a spring and/or sleeve for adjustability. The connector may range in size and be customized corresponding to known tailgates of various commercially-sold vehicles.

The right and left panels of the adapter may be parallel to the sides of the truck or may be angled inwards from the sides of the truck. In a specific embodiment, the right and left panels may each comprise 1) a first section having a cut-out (anti-theft holes) that surrounds a bolt or protrusion on the truck when in-use, 2) a second section angled inwardly from the first section, and 3) a third section extending rearwardly from the second section to engage or hold a folded ramp section. This configuration allows the truckbed to be extended in a central portion. In another specific embodiment, the right and left panels may have a pivoting mechanism, such as a hinge or spring, which allows them to be moveable between an angled position and a parallel position that is substantially parallel to the sides of the truck.

The left and right panels may comprise a motif or advertisement. The motif or advertisement may be painted, powder-coated on, or cut out from the panels. Alternatively, the motif or advertisement may be a sign that is affixed to a panel, for example, via screws, rivets, welding, or any suitable attachment means. In one embodiment, the right and/or left panels may comprise one or more lights, for example, LED or neon lights.

The right and left panels of the adapter may comprise anti-theft holes. In embodiments, the anti-theft holes may be on the first section of the adapter and may allow for removably affixing of a locking mechanism to the adapter, thereby locking the adapter onto the truck, for example, around a bolt or protrusion on the truck.

The right and left panels may each comprise one or more release pins for releasable engagement with the ramp section when it is in a folded configuration. In a specific embodiment, the right and left panels each comprise a release pin on the third section.

The connector extends between the left and right panels and, in specific embodiments, may have one or more flanges or protrusions for affixing or attaching the ramp section. The ramp section may be permanently or removably affixed to the adapter. In a specific embodiment, the ramp section may be affixed to the connector by attachment means including, but not limited to, welds, bolts, screws, nails, adhesives, bands, quick disconnect pins, hinges, cables, hooks, clevis, or any other suitable fastener.

B. Foldable Ramp Section

The ramp section may comprise one or more foldable sections (e.g., 3 or 4 foldable sections). The one or more foldable sections may be connected to each other via attachment means including, but not limited to, welds, bolts, screws, nails, adhesives, bands, quick disconnect pins, hinges, cables, hooks, clevis, or any other suitable fastener. In a specific embodiment, the one or more foldable sections may be connectable to each other via a spring or spring-assisted hinge mechanism, thereby helping absorb the weight of the ramp when it is folded or unfolded.

In a specific embodiment, one foldable section may be removably connectable to another foldable section to allow a user to select individual sections, for example, based on a desired length, width, weight, or other dimension, and/or for varying purposes or end uses. For example, one section of the ramp may be affixed to the adapter and act as a tailgate, while one or more other sections may be added and removed onto that section as desired.

In specific embodiments, each foldable section may be about 36-144 inches in length (e.g., corresponding to a tailgate extending between 2 rear sides of a vehicle); about 12-72 inches in height (e.g., corresponding to a vehicle tailgate height); and about 0.5-6 inches in thickness.

The at least one foldable section may comprise one or more holes on each end thereof, for receiving release pins affixed on the adapter. In another embodiment, at least one foldable section may comprise at least one stop (e.g., welded protrusion) to rest on the adapter when the ramp section is in a folded-up and secured state, thereby preventing the folded ramp section from entering the truckbed and, in specific embodiments, helping align the one or more holes in at least one foldable section with release pins in the adapter.

The one or more foldable sections may have a solid structure or may have a grid structure with a plurality of openings. The openings may be of any shape (e.g., circular, square, rectangular, elliptical) and may be arranged in an array. In a specific embodiment, one foldable section (e.g., outermost section when the ramp section is folded and installed) may have one or more cut-out openings that serve as access points, whereby a user may reach through and pull out or access another ramp section (e.g., an inner section). The inner section to be accessed may have sister cut-out openings, handles, or the like that allow the user to easily grasp the inner section.

In a specific embodiment, the tailgate ramp may have at least one of a mechanical, motorized, or electrical assist to activate deployment/unfolding or retraction/folding of the ramp section. In a particular embodiment, the assist may comprise a gears, hoist, pulley, hydraulic system (e.g., cylinders, arms, pistons, springs, etc.), winch, crank or cabling system or device.

In embodiments, at least one foldable section of the ramp section may comprise a motif or advertisement. The motif or advertisement may be painted, powder-coated on, or cut out from the panels. In another embodiment, the at least one section may comprise one or more lights, for example, LED or neon lights.

At least one foldable section may have one or more accessories for holding or affixing items or devices to the tailgate ramp, for example, holders for fishing rods; racks for bicycles or for camping, sporting, or outdoor equipment; shelving or hangers for construction equipment; hard and soft case enclosed bins for storage; removable roller decks (e.g., for loading watercraft); and the like. The accessories may be permanently or removably attached to at least one foldable section.

In specific embodiments, the ramp section allows it to double as either a table (e.g., having a size of 24-48 inches) for either recreation or for work (e.g., as a workbench). In specific embodiments, the tailgate ramp may allow a user to haul materials and its configuration extends the actual truck bed in a central portion by about 6-16 inches, depending on make/model/year of the truck.

The adapter and/or the ramp section may comprise a material selected from the group consisting of a metal, a metal alloy, plastic, ceramic, or any combination thereof. In specific embodiments, the tailgate ramp comprises an aluminum alloy, which is virtually impervious to rust and also provides superior strength to weight ratio. For example, AA 6063-T6 has an ultimate tensile strength of at least 28,000 psi (196 MPa) and yield strength of at least 23,000 psi (165 MPa).

The tailgate ramp replaces an existing tailgate using the adapter. For purposes of illustration only, a 2001 Ford F-150 truck was utilized; however, the adapter may be utilized with trucks from other manufacturers. In embodiments, the tailgate ramp of the present invention slides into position, similarly to how the original tailgate fastens to the truck.

C. Description of the Figures

Figure 1A:
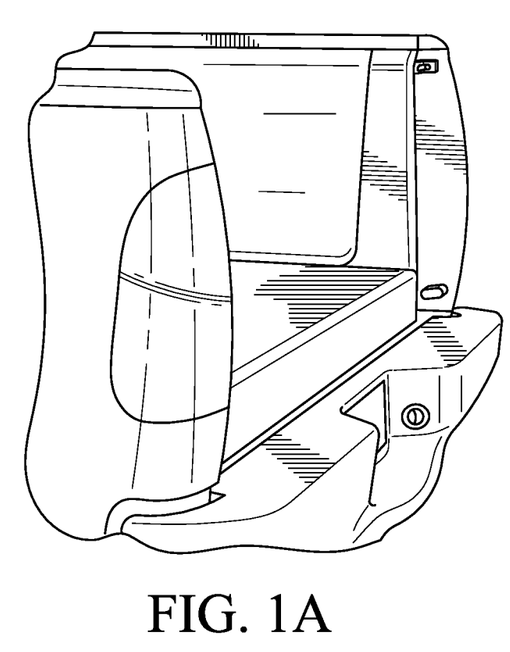
FIGS. 1A-1C show removal of a tailgate from a truck.
Figure 1B:
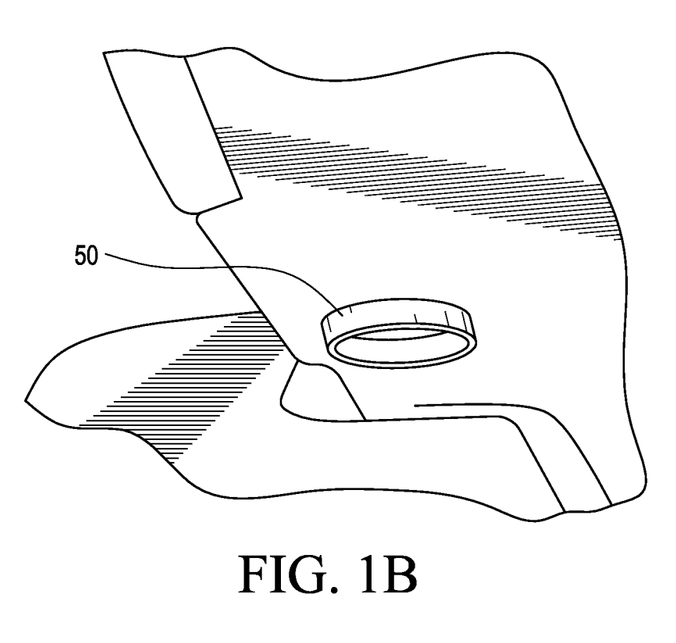
Figure 1C:
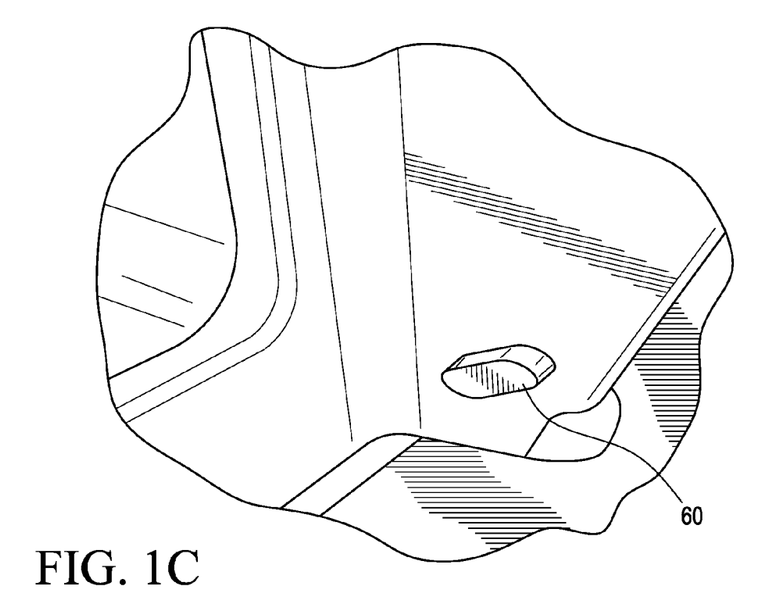

FIGS. 1A-1C show removal of a stock tailgate from a truck, thereby exposing a truck's left stock, circular tailgate mounting receiver 50 and the right pivoting receiver 60.

Figure 2A:
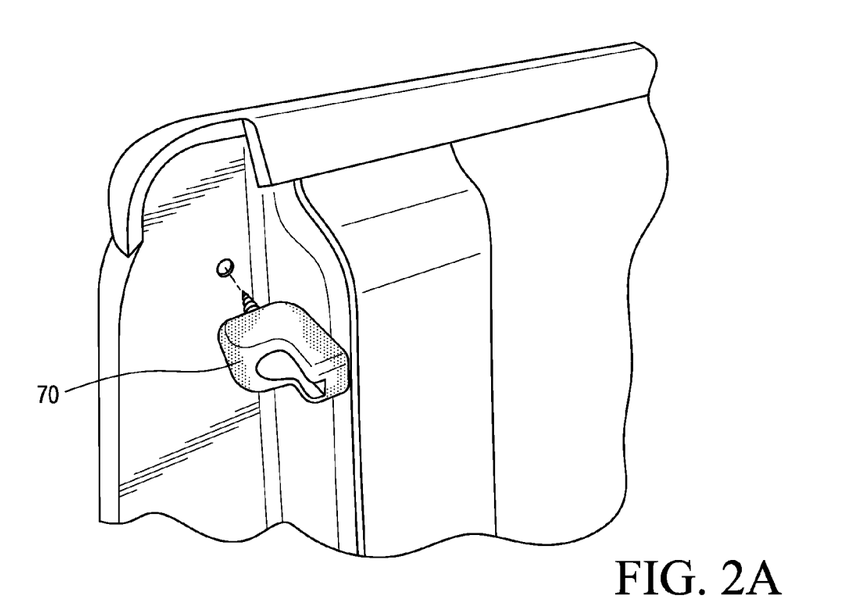
FIG. 2A shows preparation of a truck for receiving an adapter according to the present invention by removal of stock rubber "bumpers" that cushion the stock tailgate when in a closed position.
Figure 2B:
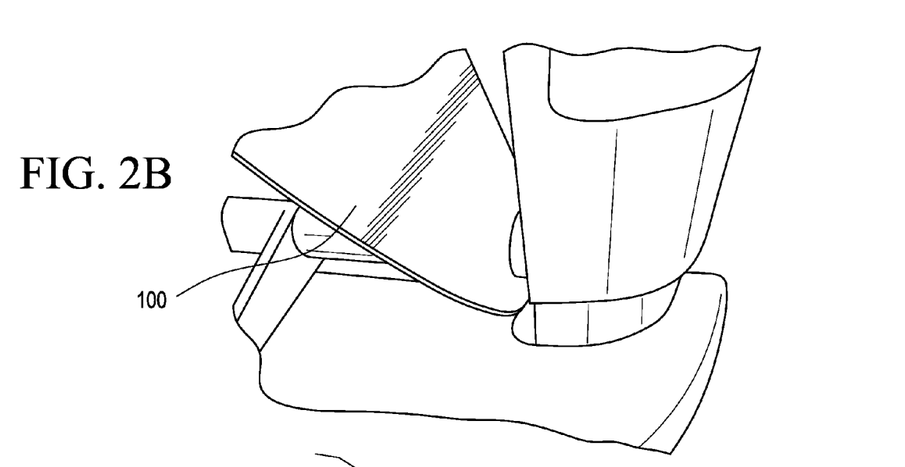
FIG. 2B shows the truck receiving the adapter.

FIG. 2A shows preparation of a rear of a truck for receiving an adapter according to the present invention by removal of stock rubber bumpers 70 that cushion the tailgate when in a closed position. FIG. 2B shows the truck receiving the adapter.

Figure 3:
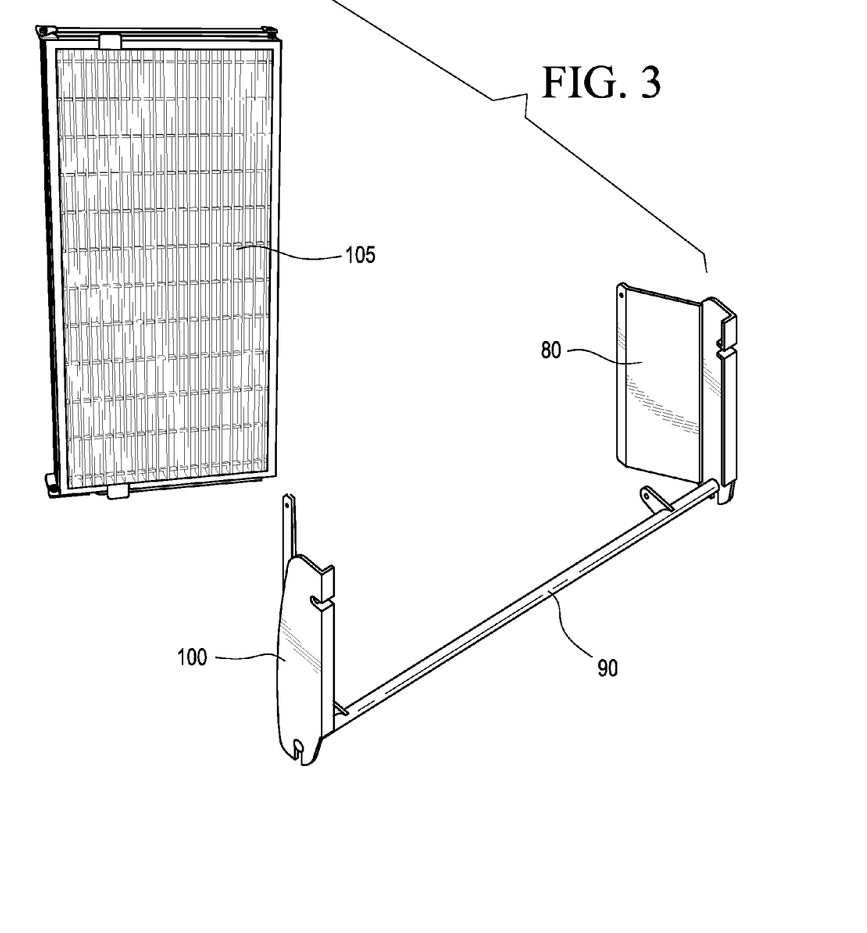
FIG. 3 shows the adapter and an attachable folded ramp section according to one embodiment of the present invention.

FIG. 3 shows the adapter 80 with connector 90 extending between right and left panel sections 100 and folded ramp section 105, comprising the tailgate ramp of the present invention awaiting deployment.

Figure 4:
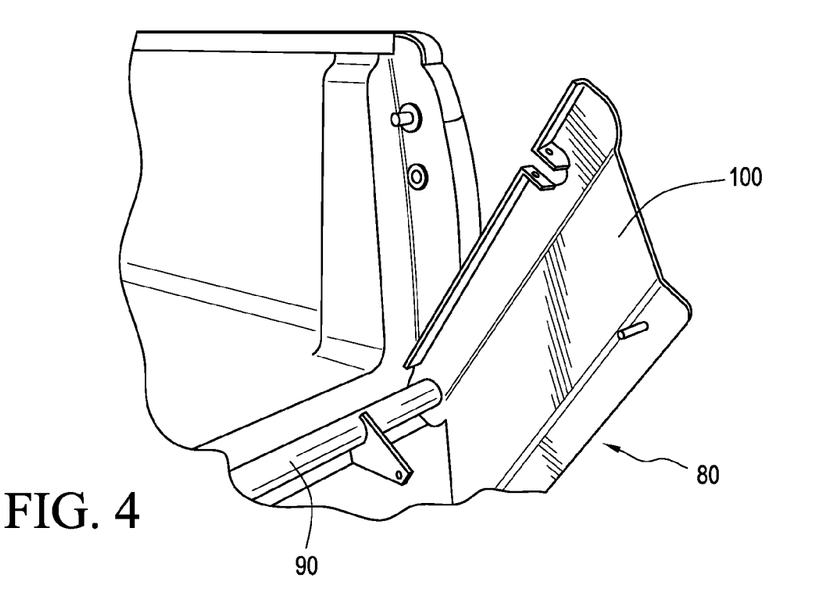
FIG. 4 shows attachment of the adapter to the truck as one would a normal tailgate.

FIG. 4 shows a tube of the adapter 80 attached to the truck's right pivoting receiver, which locks the connector to the truck. The adapter 80 is raised, as would be a normal tailgate. Accordingly, no modifications of the stock truck or tailgate components are necessary.

Figure 5A:
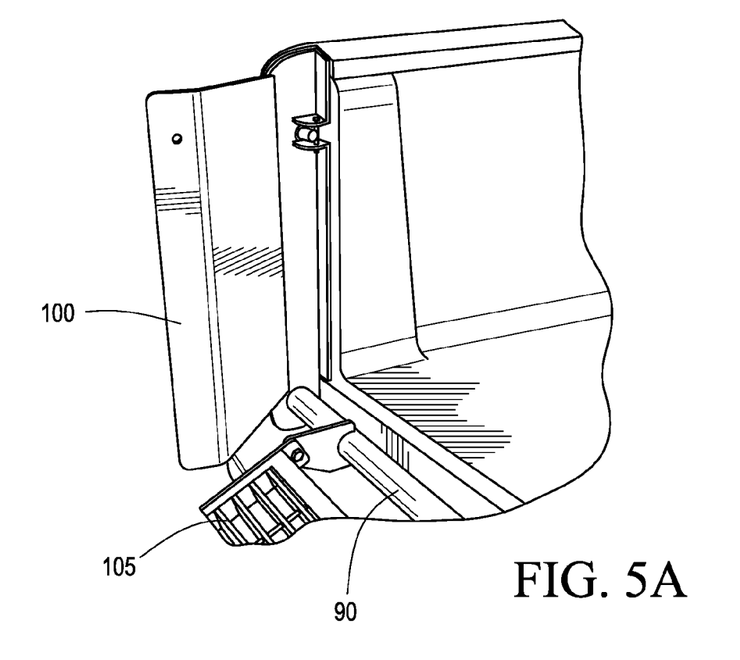
FIG. 5A shows the adapter affixed to the rear of the truck.

FIG. 5A shows the adapter 80 affixed to the truck (in particular attached to the truck's left circular mounting receiver) with ramp section 105. As shown, one of the panels 100 has a cut-out motif or advertisement (Rambl'in Ramps™)

Figure 5B:
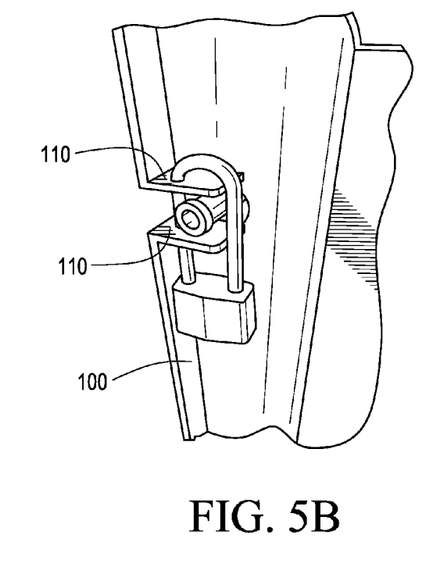
FIG. 5B shows placement of a lock through the adapter's anti-theft receiving holes according to an embodiment of the present invention.
Figure 5C:
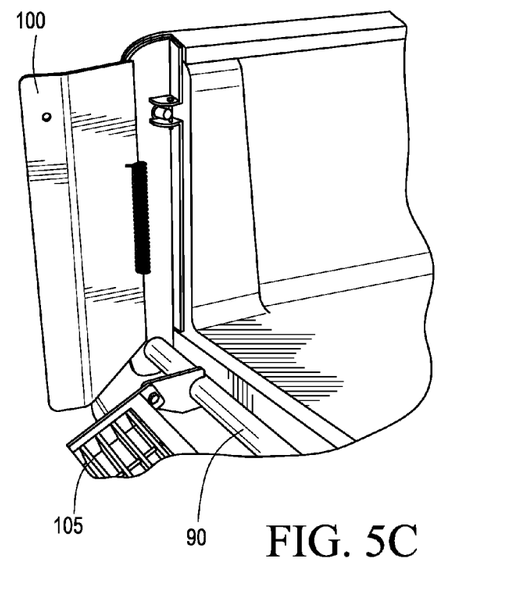
FIG. 5C shows a spring mechanism by with the panels can be adjusted according to an embodiment of the present invention.

FIG. 5B shows a locking mechanism placed through the anti-theft receiving holes 110 on one of the right and left panels 100 of adapter 80. This locks an upper portion of the adapter in place, for example, around bolts or protrusions on the truck that are exposed after removal of the rubber bumpers. FIG. 5C shows a spring mechanism by with an angle of a panel can be adjusted according to an embodiment of the present invention.

Figure 6A:
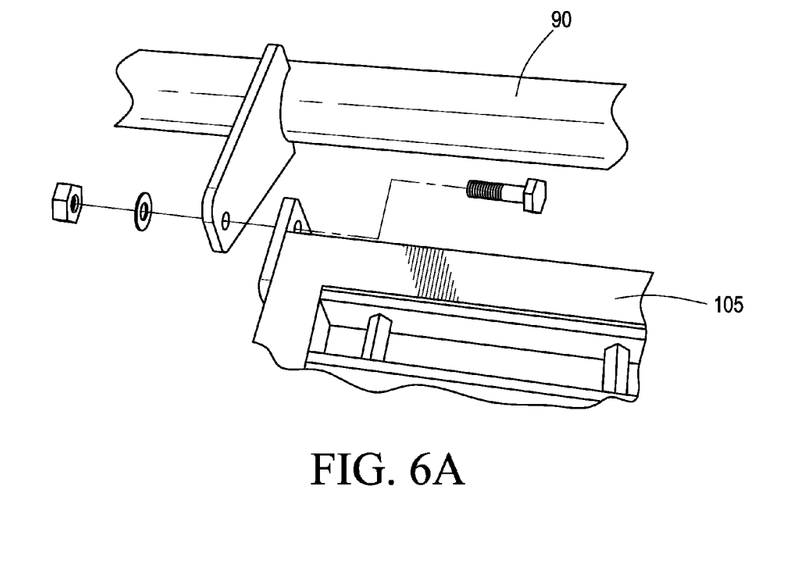
FIGS. 6A-6B shows attachment of the ramp section to the adapter which has been mounted to the truck.
Figure 6B:
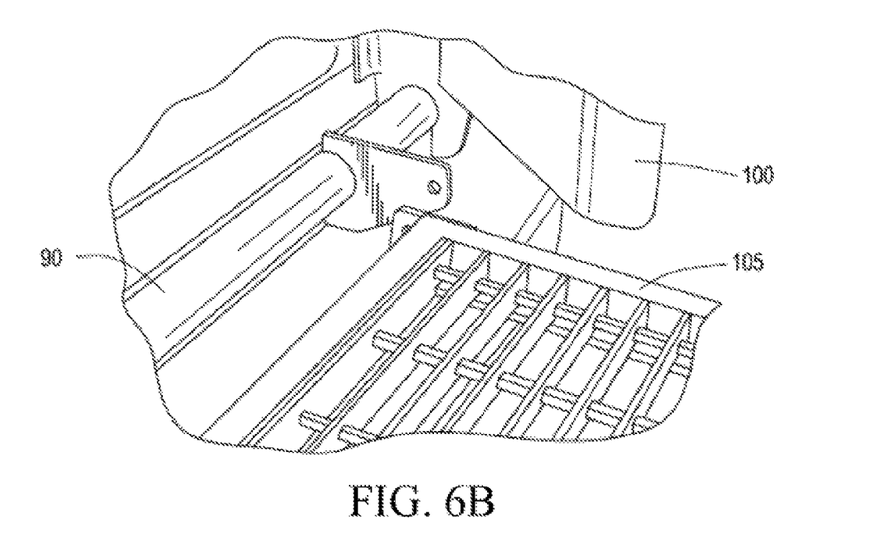

FIGS. 6A-6B show a ramp section 105 waiting to be affixed or attached to the adapter 80. The ramp section 105 is attachable via attachment means. In a specific embodiment, the ramp section 105 may be affixed to the adapter 80 on one or both of a left side or a right side of connector 90.

Figure 7A:
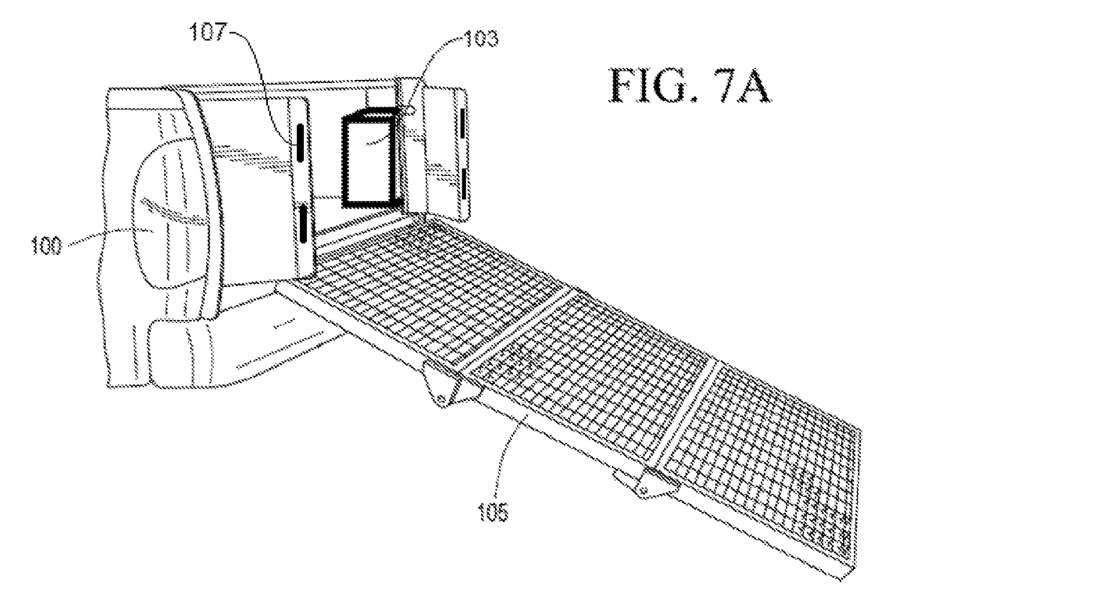
FIGS. 7A-7C show the tailgate ramp according to the present invention ready to load, ready to be folded for transport or ready to be utilized for a work surface.
Figure 7B:
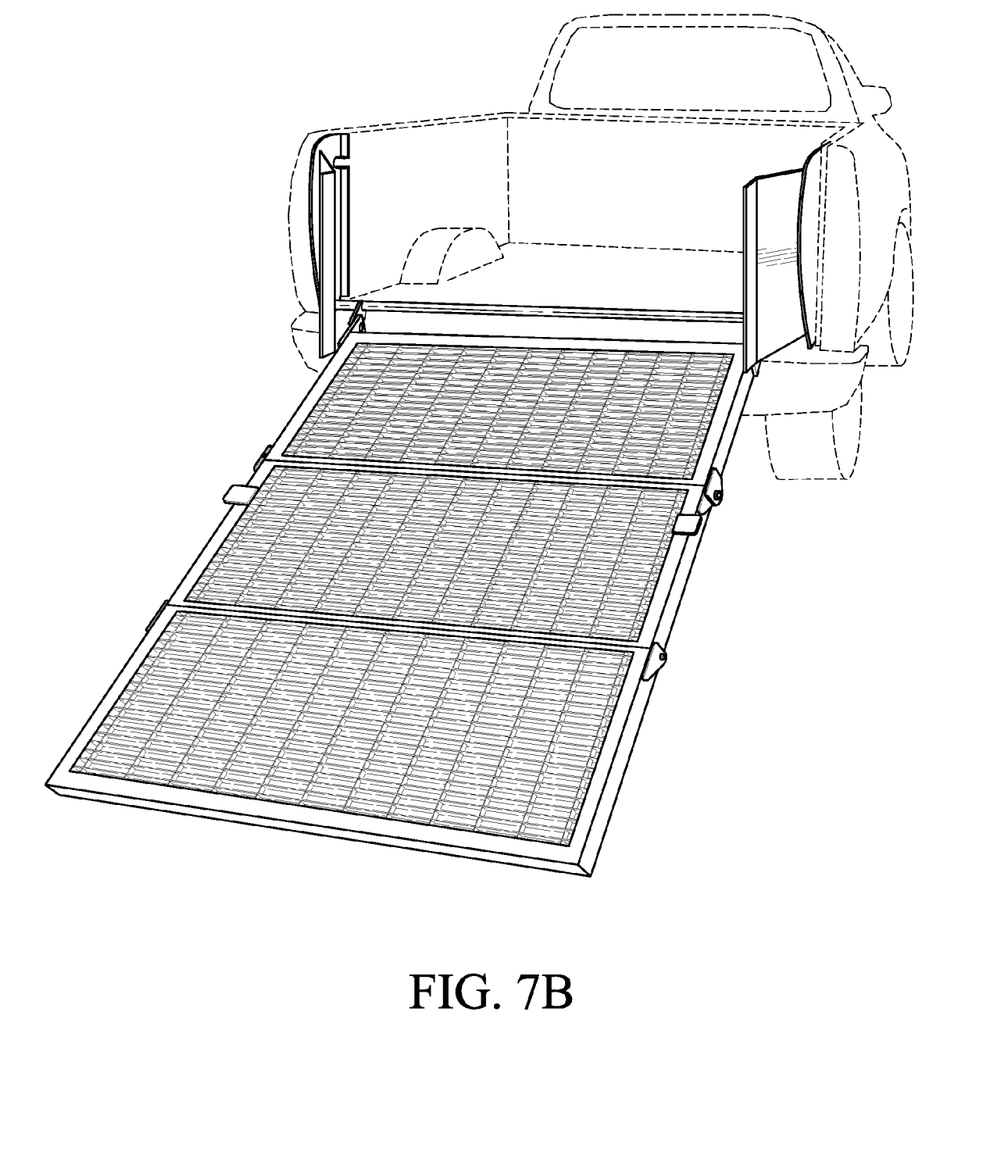
Figure 7C:
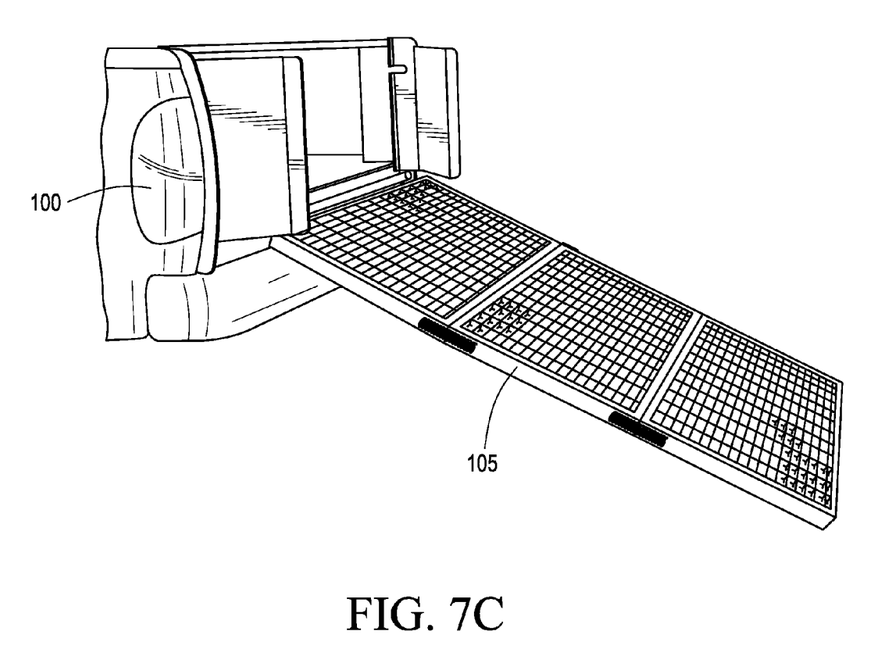

FIGS. 7A-7C show attachment of the ramp section 105 to the adapter 80 that has been mounted to the truck. The tailgate ramp is ready to load or ready to be folded, for either permanent fixture to the truck or for temporary fixture and use. FIG. 7C shows an embodiment in which the one or more foldable sections are connectable to each other via a spring or spring-assisted hinge mechanism.

Figure 8A:
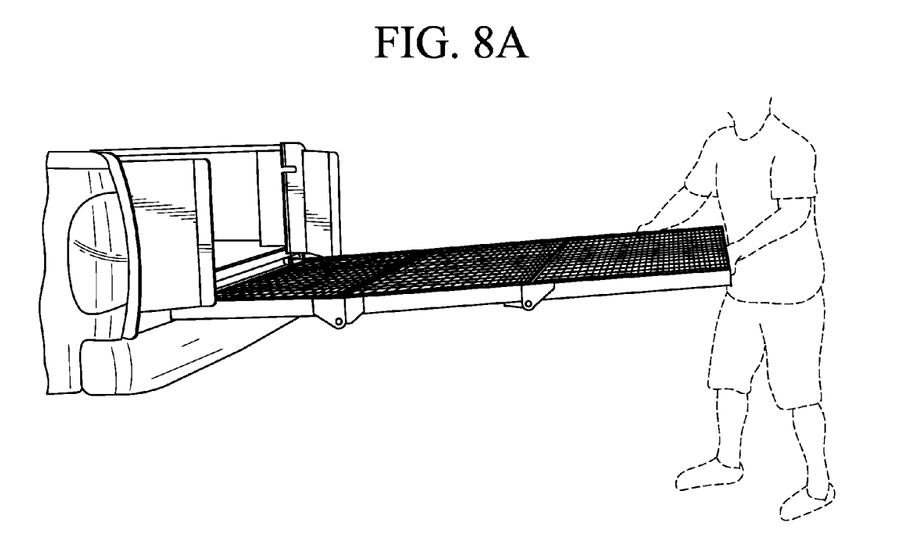
FIGS. 8A-8B show raising a lower portion of the ramp section to begin a folding process according to one embodiment of the present invention.
Figure 8B:
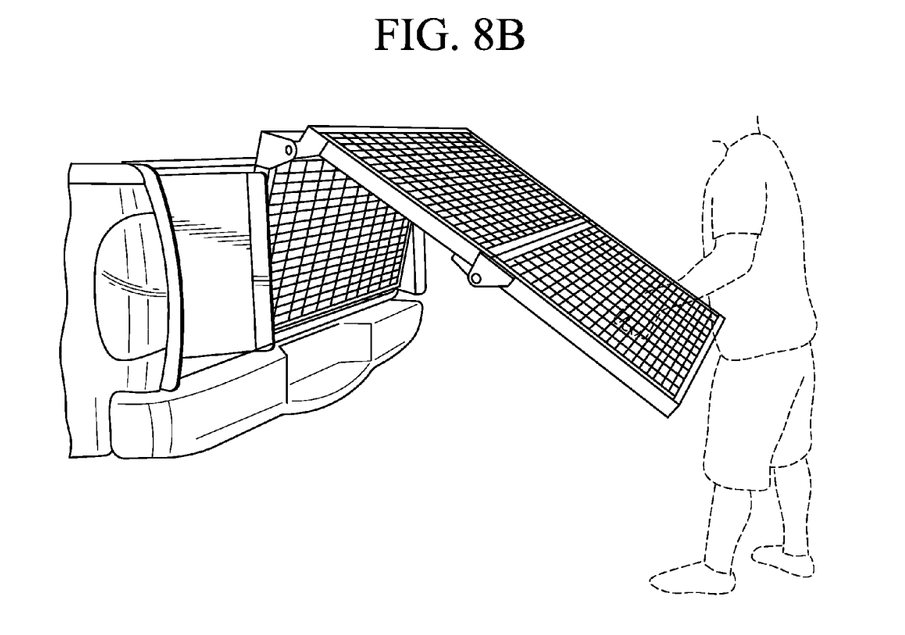

FIGS. 8A-8B show a lower portion of the ramp section 105 raised to begin a folding process.

Figure 9A:
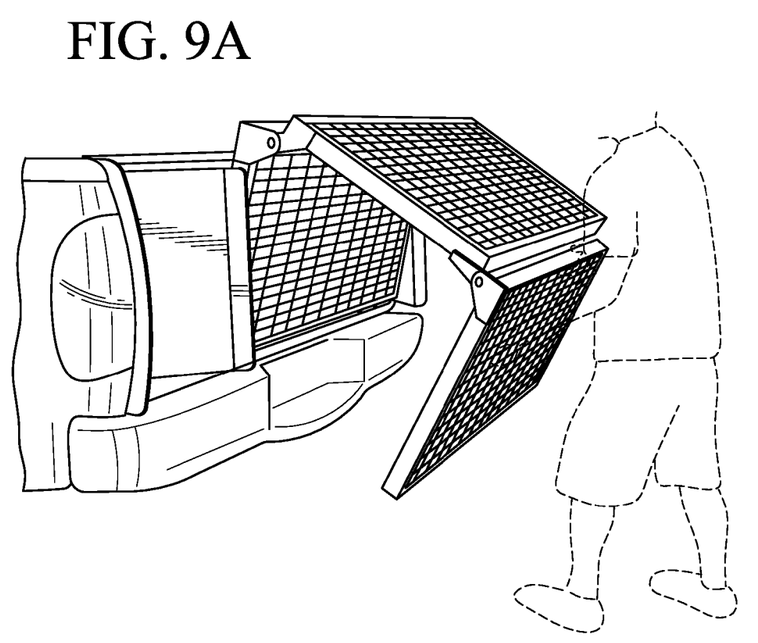
FIGS. 9A-9B show a third (bottom) portion of the ramp is pushed up and under the second (middle) portion and when in the closed position sits between the first (top) portion and the third (bottom) portion according to one embodiment of the present invention.
Figure 9B:
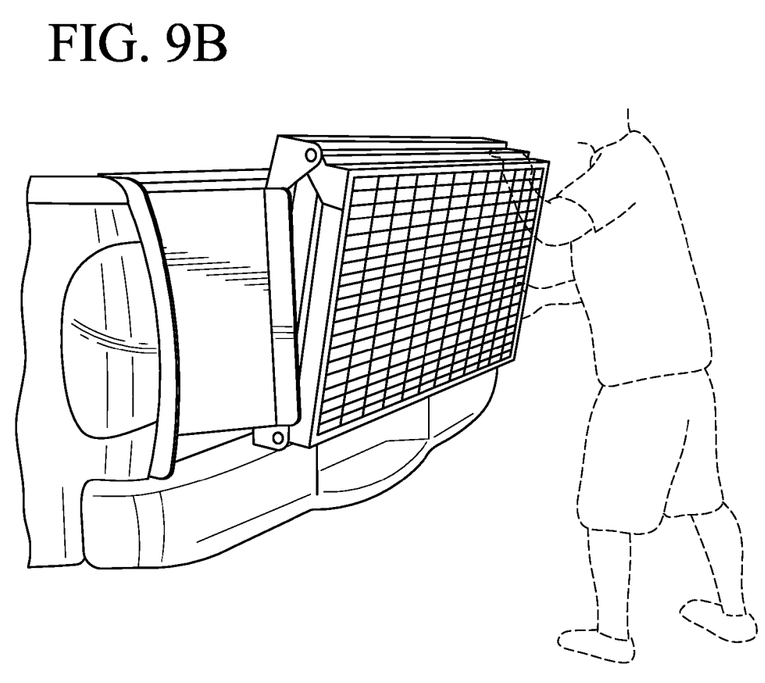

FIG. 9A shows a third (bottom) portion of the ramp section pushed up and under a second (middle) portion. When in the closed position, the third (bottom) portion rests between the first (top) portion and the second (middle) portion, as shown in FIG. 9B.

Figure 10:
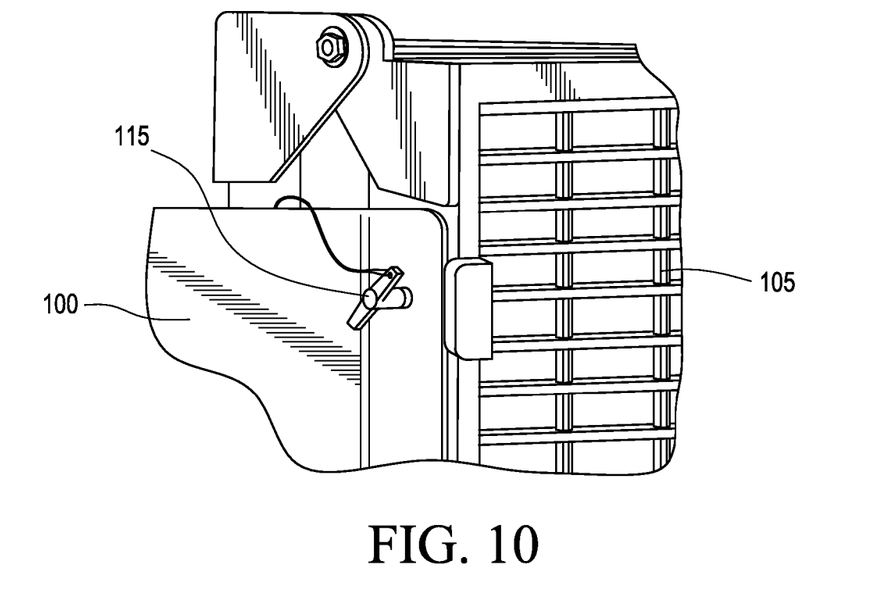
FIG. 10 shows the ramp section closed and pushed into place to be locked to the adapter by quick disconnect pins according to one embodiment of the present invention.

FIG. 10 shows the tailgate ramp of the present invention in a folded-up, closed position. The ramp section 105 is pushed into place and locked to the adapter 80 by release pins 115. In specific embodiments, the release pins 115 may be affixed to the adapter 80 by a cable to assure that they are not misplaced.

Figure 11:
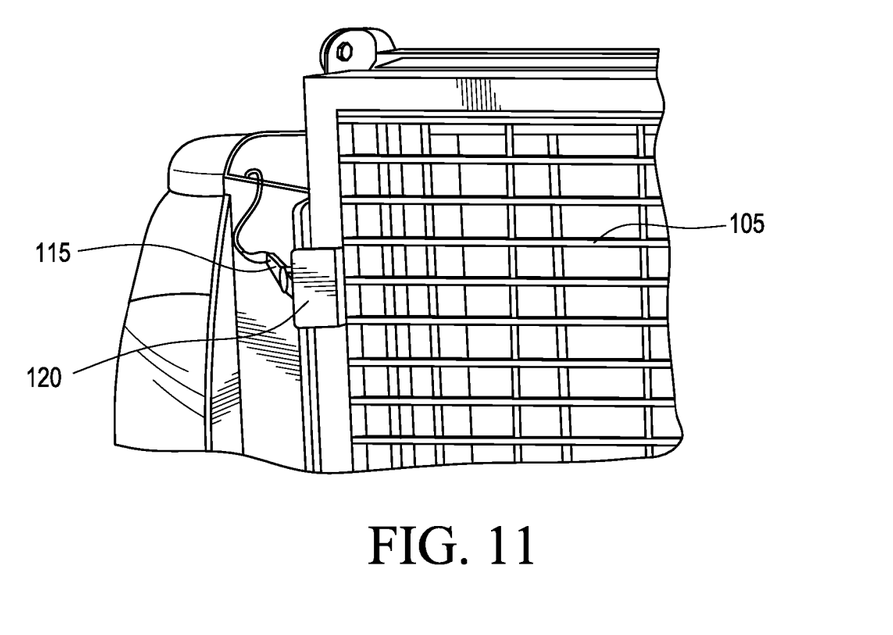
FIG. 11 shows a second (middle) portion has a "stop" welded to its section to prevent the ramp from falling into the truckbed according to one embodiment of the present invention.

FIG. 11 shows the second (middle) portion of the ramp section 105 may have a "stop" 120 welded to it to prevent the ramp section 105 from falling into the truckbed. The stop 120 rests against the adapter 80, and in specific embodiments, line up pre-drilled holes in at least one foldable section of the ramp section to receive release pins 115.

Figure 12:
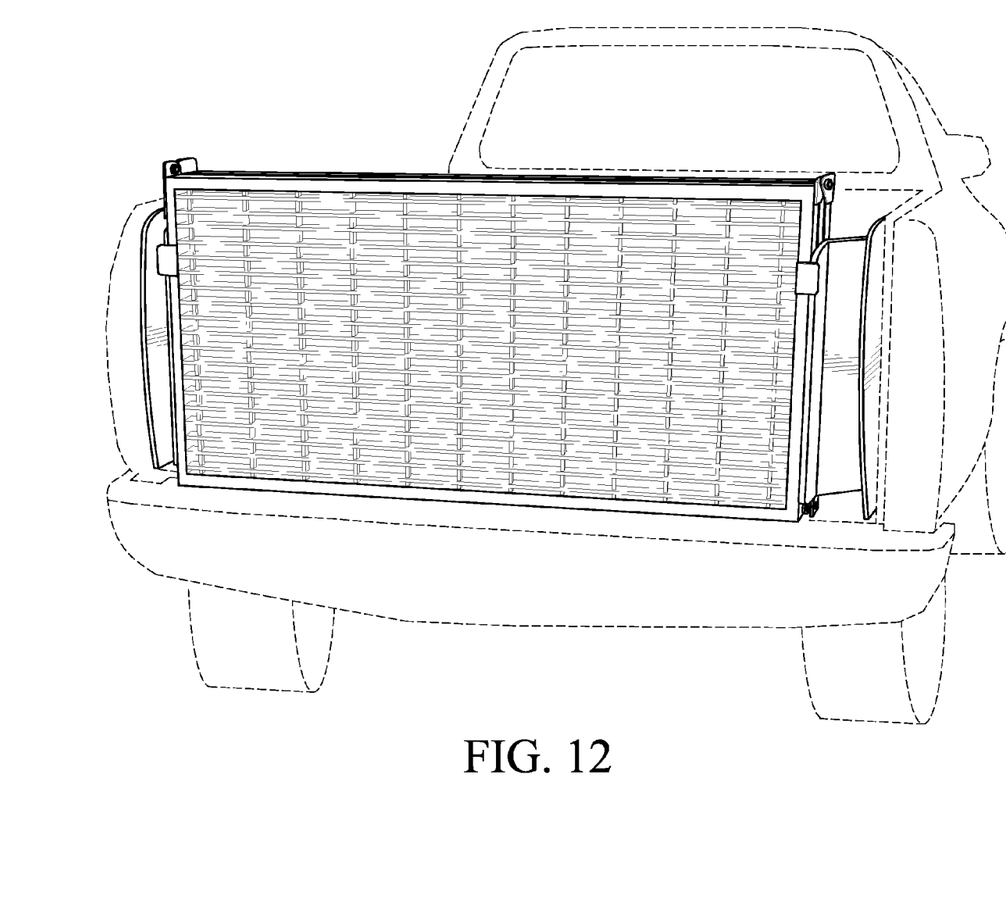
FIG. 12 shows the tailgate ramp securely attached to the truck and ready to be utilized.

FIG. 12 shows the tailgate ramp securely attached to the truck and ready to be utilized.

Figure 13A:
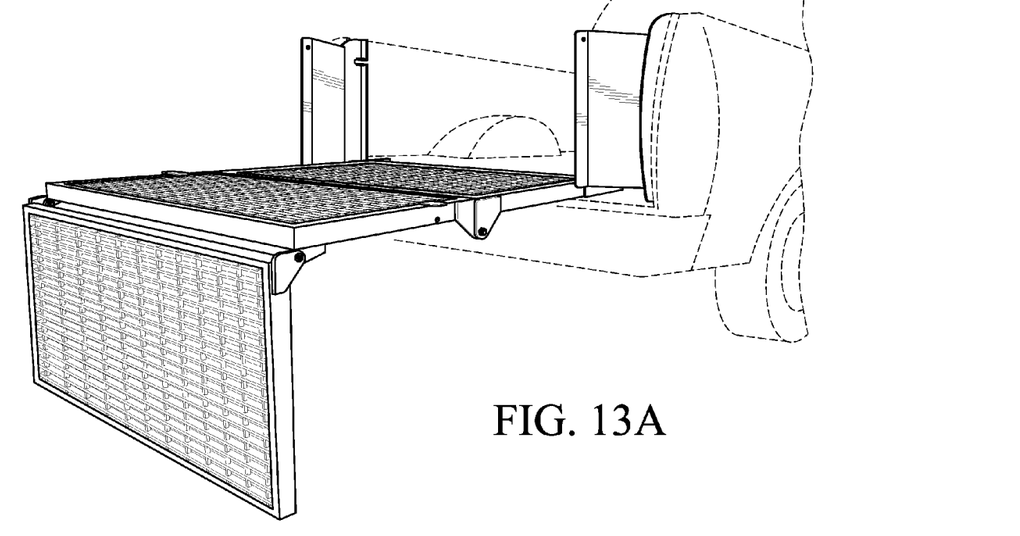
FIGS. 13A-13B show the ramp section folded out to be utilized, for example, as a table or workbench.
Figure 13B:
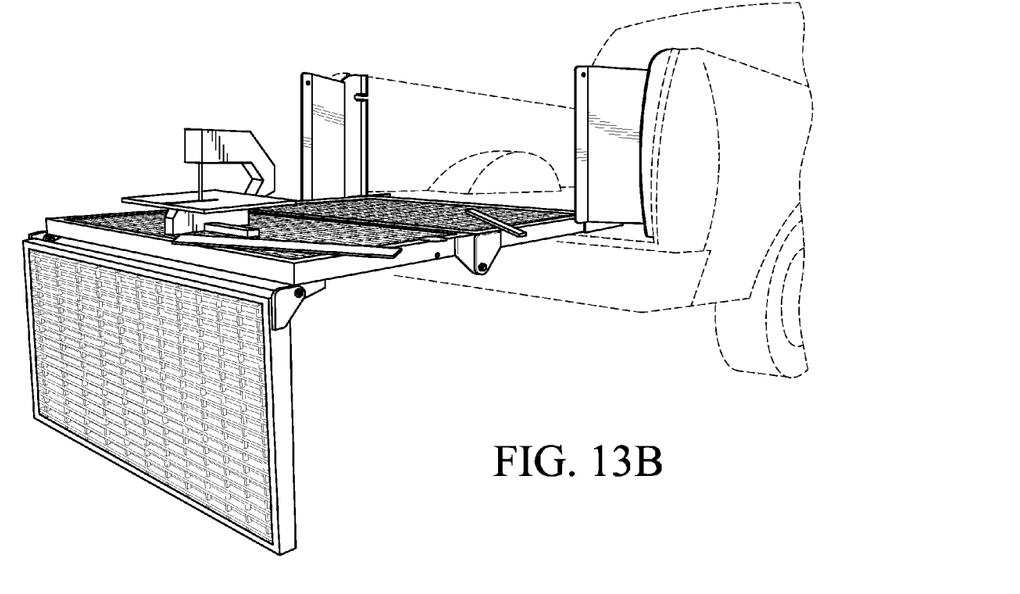

FIGS. 13A-13B show that the ramp section can be unfolded or folded out to be utilized for either a table (e.g., 24-48 inches) for tailgate parties, campers, etc., or a workbench for the tradesman, carpenter, handyman, and the like. In a specific embodiment when the ramp section is utilized as a table, the one or more foldable ramps sections may include a locking mechanism (e.g., rod, bracket, pin, or hinge) to keep one foldable section at a 90 degree angle relative to one or more other foldable sections.

Although the present invention has been described in terms of particular example embodiments, it is not limited to those embodiments. The embodiments, examples, and modifications which would still be encompassed by the invention may be made by those skilled in the art, particularly in light of the foregoing teachings.

As used above "substantially," "generally," "about", and other words of degree are relative modifiers intended to indicate permissible variation (e.g., ±10%, ±5%, ±1%) from the characteristic so modified. It is not intended to be limited to the absolute value or characteristic which it modifies but rather possessing more of the physical or functional characteristic than its opposite, and preferably, approaching or approximating such a physical or functional characteristic.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

What is claimed is:

1. A tailgate ramp for a truck, comprising:
   an adapter comprising left and right panels with a connector extending therebetween, said connector comprising: a first end with a slot or opening to engage or slide onto a pivoting receiver located on a truck; and a second opposing end configured to slide into, over, or around a mounting receiver located on the truck; and
   a ramp section comprising two or more foldable sections that are attachable to said connector;
   wherein said left and right panels are each angled inwardly from an inner side of the truck and rearwardly from the tailgate of the truck.

2. A tailgate ramp according to claim 1, wherein said right and left panels each comprise:
   1) a first section having a cut-out that surrounds a bolt or protrusion on the truck when in-use,
   2) a second section angled inwardly from an inner side of the truck from the first section, and
   3) a third section extending rearwardly from the second section and from the tailgate of the truck to engage or hold said ramp section when folded.

3. A tailgate ramp according to claim 1, wherein said connector further comprises one or more flanges or protrusions for affixing said ramp section.

4. A tailgate ramp according to claim 1, wherein the first end and the second end of said connector have a TEFLON® coating or sleeve.

5. A tailgate ramp according to claim 1, wherein said adapter further comprises anti-theft holes for removably affixing a locking mechanism to the adapter.

6. A tailgate ramp according to claim 1, wherein said adapter further comprises one or more release pins for releasable engagement with said ramp section.

7. A tailgate ramp according to claim 6, wherein one foldable section comprises one or more holes on each end for receiving a release pin.

8. A tailgate ramp according to claim 7, wherein one foldable section comprises at least one stop comprising a welded protrusion on a side of said foldable section that rests on said adapter in a folded-up configuration, thereby aligning the one or more holes with the one or more release pins on said adapter.

9. A tailgate ramp according to claim 1, wherein the two or more foldable sections are connected to each other via at least one quick disconnect pin, a hinge, a cable, a hook, spring, or a clevis.

10. A tailgate ramp according to claim 1, wherein the two or more foldable sections are removably connectable to each other.

11. A tailgate ramp according to claim 10, wherein a first foldable section is attached to the adapter, and one or more second individually-selectable foldable sections are removably attachable to the first foldable section.

12. A tailgate ramp according to claim 1, wherein the two or more foldable sections are connectable to each other via a spring or spring-assisted hinge mechanism.

13. A tailgate ramp according to claim 1, wherein said left and right panels comprise a motif or advertisement that is painted, powder-coated on, or cut out from the panels or comprises an attached sign.

14. A tailgate ramp according to claim 1, wherein at least one of said adapter or said ramp section comprises an aluminum alloy.

15. A method for attaching a tailgate ramp to a truck, comprising:
   removing a tailgate from a rear of a truck, thereby exposing a mounting receiver and a pivoting receiver on the truck;
   attaching an adapter to the rear right side and rear left side of the truck, said adapter comprising left and right panels with a connector extending therebetween, said connector comprising: a first end with a slot or opening to engage or slide onto the pivoting receiver; a second opposing end configured to slide into, over, or around the mounting receiver, wherein said right and left panels are each angled inwardly from an inner side of the truck and rearwardly from the tailgate of the truck; and
   attaching a ramp section comprising two or more foldable sections that is attachable to said connector.

16. A method according to claim 15, further comprising removably affixing a locking mechanism to anti-theft holes on said adapter, thereby locking the adapter onto the truck.

17. A tailgate ramp for a truck, comprising:
   an adapter comprising a left panel and a right panel with a connector extending between said panels, wherein the left panel and the right panel are each angled inwardly from a respective inner side of a truck and rearwardly from a tailgate of the truck, thereby extending a central portion of a truckbed;
   said connector comprising 1) a first end to engage a pivoting receiver located on the truck and 2) a second opposing end configured to engage a mounting receiver located on the truck; and
   a ramp section comprising two or more foldable sections that are attachable to said connector.

* * * * *